United States Patent

Dillon

[11] Patent Number: 5,922,166
[45] Date of Patent: Jul. 13, 1999

[54] IMMERSION AND COMPRESSION PROCESS FOR CONSTRUCTING A LAMINATE COMPOSITE AND LAMINATE ARTICLES

[75] Inventor: Joseph E. Dillon, Mechanicsville, Pa.

[73] Assignee: Donaldson Company, Inc., Minneapolis, Minn.

[21] Appl. No.: 08/595,223

[22] Filed: Feb. 1, 1996

[51] Int. Cl.$^6$ .................................................. C09J 5/02
[52] U.S. Cl. ........................ 156/324.4; 156/333; 428/282; 428/315.9
[58] Field of Search ................. 156/324.4, 333; 428/315.9, 282

[56] References Cited

U.S. PATENT DOCUMENTS

| | | | |
|---|---|---|---|
| 2,662,065 | 12/1953 | Berry | 156/333 |
| 4,031,288 | 6/1977 | Fagan . | |
| 4,324,574 | 4/1982 | Fagan . | |
| 4,333,786 | 6/1982 | Civardi et al. | 156/324.4 |
| 4,877,683 | 10/1989 | Brawgaw et al. . | |
| 4,943,475 | 7/1990 | Baker et al. | 428/315.9 |
| 4,983,434 | 1/1991 | Sassa . | |
| 4,988,540 | 1/1991 | Brawgaw et al. . | |
| 5,066,683 | 11/1991 | Dillon et al. . | |
| 5,096,473 | 3/1992 | Sassa et al. . | |
| 5,104,727 | 4/1992 | Wnenchak | 428/315.9 |
| 5,308,485 | 5/1994 | Griffin et al. . | |

OTHER PUBLICATIONS

Product Information Sheet—DuPont Teflon® FEP 120 fluoropolymer resin. (4 pgs.).

*Primary Examiner*—John J. Gallagher
*Attorney, Agent, or Firm*—Merchant, Gould, Smith, Edell, Welter & Schmidt, P.A.

[57] ABSTRACT

A method for constructing a laminate comprising two layers, including an acrylic homopolymer layer and a microporous PTFE layer wherein the acrylic layer is a felt and is pretreated by immersion into an adhesive solution and introduced to the PTFE layer and subjected to heat and pressure to form a laminate useful as a filtration material. A laminate useful as a filtration material is formed by the immersion process.

19 Claims, 1 Drawing Sheet

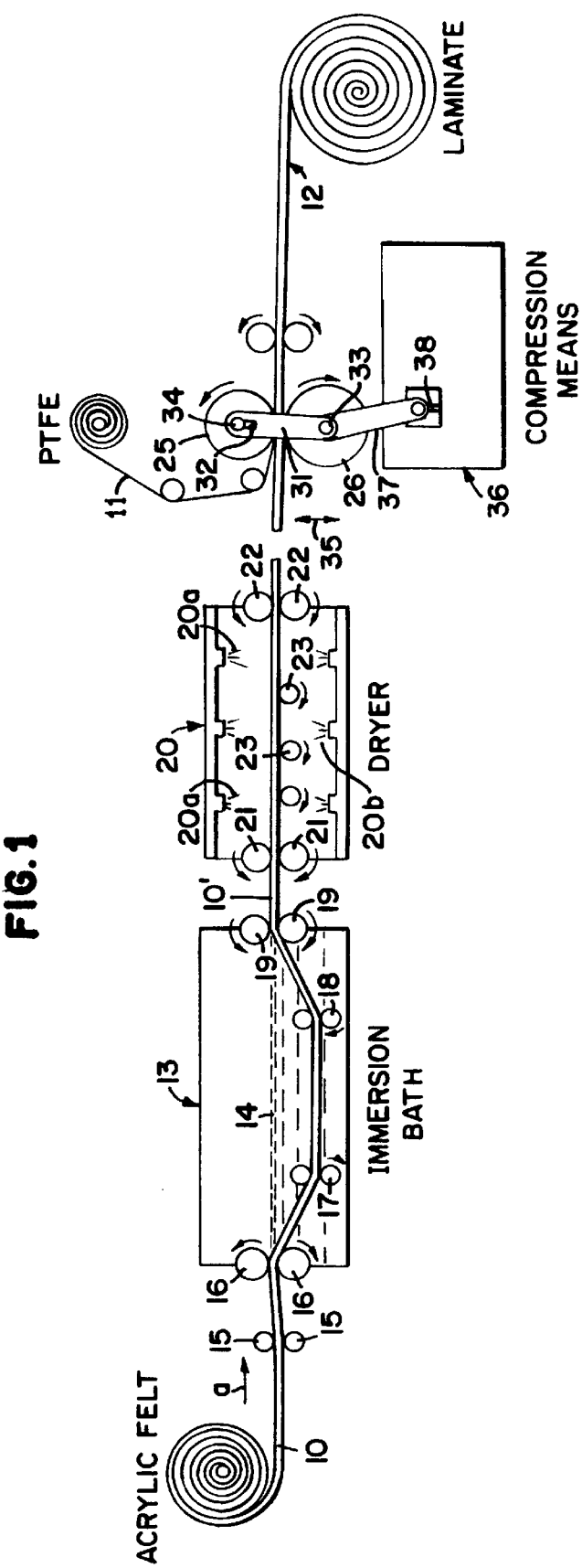

IMMERSION AND COMPRESSION PROCESS FOR CONSTRUCTING A LAMINATE COMPOSITE AND LAMINATE ARTICLES

BACKGROUND OF THE INVENTION

1. Field of Invention

The present invention relates to the field of laminates, and more particularly to porous laminates and their construction.

2. Brief Description of the Prior Art

Textiles are often used in industrial applications. Textiles can be processed to provide characteristics called for by a specific use and can be constructed from natural or synthetic materials. For example, porous materials have been used successfully in the filtration of gaseous, liquid and solid particulate materials. Textiles may be used singly or in a composite material such as a laminate. For example, webs or mats of fiberglass have been employed where concerns of heat resistance, and the need of materials to withstand temperatures of 500° to 1000° F. or higher is essential.

Textiles can be used to form composite materials in conjunction with other materials, including other textiles. For example, laminates can be used in the construction of filtration materials, from coffee pot and food filtration devices to industrial filters. A material that has been used in producing a laminate is glass fibers. At high temperature applications, the glass fibers offer resistance to melting and degradation. In the preparation of composite materials, heat bonding of material layers can be done if the materials are compatible. However, not all materials can be combined with one another due to the variations in physical properties possessed by given substances and materials, and the treatment processes a given material must undergo.

PTFE (polytetrafluoroethylene) is a material which will resist heat and chemical degradation in a number of environments. Porous PTFE therefore, has excellent properties for use as a filtration material. The pore size of the material can be varied to suit particular applications where discriminating removal of particles from a fluid or gas stream is required. Porous PTFE has use as a membranous material. Therefore, it is desirable to bond the PTFE material to a substrate material which can provide the rigidity needed to form a composite which can be used as a filter.

The use of a substrate is limited in the known processes. High temperatures demand the use of substrates such as polyimide, fiberglass, PPS (polyphenylene sulfide) or PTFE compositions. In addition, high temperature bonding processes, in turn, have limitations on the types of materials which can be compatibly combined with one another.

The novel method for producing a composite material described below enables the use of a low temperature material, namely polyacrylonitrile, to be employed to form a filtration composite.

SUMMARY OF THE INVENTION

A method is provided for constructing a composite material from multiple layers of material in which a first material is bonded to a second material having a melting temperature which is substantially higher than that of the first material. The present method provides a novel process for producing a laminate from a microporous PTFE film material and an acrylic homopolymer, such as a polyacrylonitrile felt. The PTFE film and acrylic felt layers are bonded to one another with the application of heat and pressure, after immersing the acrylic layer into an adhesive solution, wherein the acrylic layer is impregnated with the solution.

It is an object of the present invention to provide a novel method for producing a laminate from materials which have substantially different melting points, by impregnating one of the materials with an adhesive solution.

It is a further object of the present invention to provide a novel method of impregnating an acrylic felt material with an adhesive solution and then bonding a layer of porous PTFE to the acrylic felt to produce a laminate.

It is another object of the present invention to produce a laminate product from the process according to any one of the aforementioned objects.

It is another object of the present invention to provide a method wherein heating means are employed to bond a material first layer of a low melting point material to a second layer of material having a higher melting point, wherein a novel construction process is employed to heat bond the first and second layers of material together.

A further object of the present invention is to accomplish the above objects wherein the bonding agent comprises a fluoropolymer resin which has a melting temperature substantially greater than the temperature at which the acrylic layer embrittles and begins to decompose.

It is a further object of the present method to provide a novel laminate construction process wherein unexpected results are achieved by subjecting an acrylic material to immersion into an adhesive solution and providing a workable treated substrate which is highly suitable and desirable for use as a filtration material.

BRIEF DESCRIPTION OF THE DRAWINGS

FIG. 1 is a longitudinal sectional view diagram representing apparatus illustrating the process of the present invention, with the pressure rollers downstream of the dryer being shown in front elevation.

FIG. 2 is a cross sectional view of a laminate according to the method of the present invention.

DETAILED DESCRIPTION OF THE INVENTION

The present method is depicted in the process diagram of FIG. 1. The substrate material utilized in the present invention comprises an acrylic felt material 10. An acrylic fiber is generally defined as any long chain polymer comprising at least 85% acrylonitrile with the remainder comprising a comononer such as, for example, vinylidene chloride. A preferred acrylic fiber felt utilized in the present invention is one comprised of 100% long chain polyacrylonitrile fiber, wherein the acrylic felt is polymerized and formed as a homopolymer of acrylonitrile. The operating temperature range of acrylic fabrics at which the fabric still remains stable is generally from about 240° to 285° F., with the preferred polyacrylonitrile acrylic material, such as Dralon T® (Farbenfabriken Bayer AG), having a continuous operating temperature up to approximately 284° F. at which the acrylic fibers remain stable. Above these temperature ranges acrylic fabrics are subject to deterioration and decomposition. Preferably the acrylic fabric is provided as a needle felt which can have either a non-woven or woven substrate base, with or without scrim. The maximum operating temperature environment for the acrylic felt of the present invention is considerably less than that of the fiberglass, polyimide and PTFE textiles, which are generally able to withstand temperatures of up to about 500° F., and perhaps greater at which temperatures, the acrylic fibers would decompose. The acrylic felt material is generally subject to embrittlement and degradation at 350° F. and ultimately chars and decomposes as temperatures approach 500° F. The acrylic felt, however, provides a substrate in the present laminate process which offers superior abrasion resistance.

The acrylic fabric is more suitable in particular applications where abrasion of the textile material is a concern. The present process provides a novel method for laminating an acrylic felt to a second layer of microporous material wherein the second layer of material has a greater melting temperature than the acrylic felt, and wherein the bonding adhesive also has a melting temperature which is greater than the temperature at which the acrylic fabric remains stable.

The acrylic homopolymer felt is porous and therefore provides a material which is semi-permeable to gases and liquids, and particles smaller than the pore size. The acrylic felt is useful as a filtration material for larger particles in a fluid or gas stream, including dry materials filtration. The acrylic felt is also superior to polyester type felts, which are more susceptible to temperature and chemical degradation, especially hydrolysis. The acrylic felt layer may be provided in a variety of thicknesses depending on the application to which the final laminate composite is to be employed. For example, the acrylic felt can be provided having a thickness in a range of from about 0.02 inches to thicknesses of a few to several inches, which can vary depending upon the need or desirability to employ thicker or thinner material in a given application.

Upon providing the acrylic homopolymer felt, the process continues to the felt treatment stage, wherein the felt is immersed into an adhesive solution. The adhesive solution preferably comprises a fluoropolymer resin, such as for example, fluorinated ethylene propylene. The acrylic felt is impregnated with the adhesive solution. In the adhesive solution FEP is preferably present with a wetting agent in an aqueous media, such as water, to form a colloid or dispersion. An example of a specific adhesive is the Teflon® FEP 120 fluoropolymer resin commercially available from DuPont, which is provided in the form of a colloid comprising approximately 54% by total weight of 0.1 to 0.30 $\mu$m fluorinated ethylene propylene particles suspended in water. The thermoplastic FEP resin has stability at temperatures up to 400° F. and has a melting temperature of approximately 500° F. as measured in accordance with ASTM Standard D2116. The fluoropolymer resin therefore has a melting temperature which is higher than the melting or decomposition temperature of the acrylic felt material.

The acrylic felt substrate is immersed into the adhesive solution so that the solution, including a quantity of the FEP adhesive, is taken up by the felt. The acrylic felt is then dried, wherein the fluoropolymer resin remains within the felt. The felt is then ready for the bonding step, wherein the porous polytetrafluoroethylene (PTFE) membrane is provided and formed into a composite with the felt.

The porous PTFE can be supplied as a film which has a pore size substantially less than that of the acrylic homopolymer which comprises the substrate. PTFE having a variety of thicknesses can be employed with the present process, depending upon the use to which the final laminate product will be put. For example, a variety of microporous PTFE films of different thicknesses can be used, including those films whose average thickness is from about 15 mil to about 0.2 mil (15/1000ths of an inch to about 2/10,000ths of an inch), although thicker and thinner PTFE layers may be utilized. Particularly preferred, is porous PTFE approximately 0.02 to 0.6 mil in thickness and having a pore size of about 2 to 4 microns. The porous PTFE is utilized in the composite as a secondary level of filtration, to prevent, for example, small particles including those smaller than the pore size from passing through the final laminate.

For example, the PTFE film may be a microporous, waterproof and moisture vapor permeable structure comprising microporous PTFE or microporous interpenetrating matrices of PTFE and polydiorganosiloxane, which have been treated with a curable or non-curable hydrophobic silicone composition, or mixtures thereof. Such a microporous PTFE film called for by the present invention can be that disclosed and claimed in U.S. Pat. No. 5,066,683 to Joseph E. Dillon, et al., the complete disclosure of which is incorporated herein by reference.

The Laminate Construction Process

The immersion process as shown in FIG. 1 comprises a series of steps wherein a first layer of material is treated and prepared for attachment to a second layer of a different material. In FIG. 1, the first layer or substrate 10 is provided and is preferably comprised of an acrylic homopolymer felt, as described above. The acrylic felt 10 has a maximum operating temperature of from about 248° to 284° F., and above these temperatures, begins to decompose. A second layer of material 11 is also provided, and preferably comprises a thin polytetrafluoroethylene (PTFE) film. The PTFE film, as discussed above, is porous and permits the passage of gaseous as well as certain liquid materials to pass there through. The pore size of the PTFE film can be provided in various diameters depending upon the nature of components to be filtered when the final laminate is utilized in filtration environment. Preferably, the pore size is provided in the range of from about 0.02 to about 10 microns (as measured by bubble point in accordance with ASTM F316), but can be varied to be smaller or larger depending on the specific application for which the final laminate, generally 12, is to be used.

The process commences by providing the acrylic homopolymer felt 10 which preferably is furished as a needle felt having a non-woven substrate base layer with or without scrim. The acrylic felt 10 is then treated to receive the adhesive, preferably by immersion into a treatment bath 13 which comprising a bonding promoter 14 which preferably comprises a fluorinated ethylene propylene polymer (FEP). The FEP is preferably provided in the form of a dispersion or colloid in an aqueous solution, as described above. A suitable wetting agent is also provided to prevent the FEP from aggregating into one area of the treatment bath 13. The adhesive 14 must then be administered to the acrylic felt 10 so that the felt can take up and carry the adhesive 14. Preferably, the acrylic homopolymer felt 10 is treated by delivering it, in the direction of arrow "a", into the bath 13 whereupon the acrylic material is immersed, as shown in FIG. 1. This can be done by serially feeding, conveying or dragging the acrylic felt material 10 through the bath 13 with conveying means or other suitable transport means. A first transport means is shown comprising a plurality of roller members 15 forming a nip between which the acrylic felt material 10 passes and is moved along thereby. Guide means, while not shown, may also be provided to assist the transport of the acrylic material 10 into the bath 13. The transport rollers 15 facilitate movement of the acrylic felt 10 to a second transport means, the immersion advancement means shown in FIG. 1 comprising a pair of immersion rollers 16. The immersion rollers 16 are rotatably provided to move the acrylic felt 10 into the bath 13 where the acrylic felt contacts the adhesive solution 14. Within the bath 13 itself, there is a plurality of submerged bath roller members 17 and 18 comprising a third transport means which guide the acrylic material 10 through the bath 13 in a manner wherein the material 10 remains submerged in the adhesive solution 14 for a suitable duration of time which will allow the solution 14 to penetrate the acrylic felt 10. This can be done by stopping the submerged bath roller members 17 and 18 to provide cycles of immersion and advancement, or can be done by operating the roller transport means to provide a continuous movement of the acrylic material through the bath, but at a speed wherein the acrylic material 10, from its point of entry into the bath 13 to its exit from the bath, remains within the adhesive solution 14 for a sufficient duration of time so that the acrylic felt 10 becomes impregnated with the solution 14. The various roller members 15, 16, 17, and 18, as well as those subsequently described herein, may be synchronously operated to provide a continuous operating flow of acrylic felt 10 through the treatment bath 13.

The acrylic material 10 must be permitted to remain in the bath until the treatment solution 14 has soaked it. The acrylic material 10 is then moved out of the bath 13 with suitable transport means such as the roller exit means comprising a pair of roller members 19 which are provided to rotate and move the treated acrylic material 10' to a drying station 20. The drying station 20 comprises suitable drying apparatus for drying the treated acrylic material 10. Preferably, the drying apparatus 20 comprises a long oven wherein gas hot air, generally 20a, can be administered by nozzles 20b to the wet acrylic felt 10' to facilitate drying. A plurality of transport members are provided in the drying apparatus 20, including the entry transport rollers 21, exit transport rollers 22 and supporting transport rollers 23. In addition, a rack or other guide means (not shown) may also be provided to support the wet acrylic material 10' which is being moved through the oven, the acrylic material now being heavier in weight due to the presence of the treatment solution 14 from the bath 13 which the acrylic material 10' carries.

The acrylic felt 10' will dry and then leave behind the desired FEP in the felt. Once dry, the acrylic material 10', which now contains the FEP adhesive, can then be taken up in a roll for storage, or, as shown in FIG. 1, can be further processed by delivering it to a transport device, such as the compression rollers 25 and 26, shown provided downstream of the drying means 20. With the compression rollers 25 and 26, the treated acrylic felt 10' can be introduced to the second layer, the PTFE film 11. The PTFE film 11 can be provided supported on a roll, as shown, to join the pretreated acrylic felt 10' by feeding it into the rollers 25 and 26 simultaneously with the treated acrylic felt 10'. While not shown, a plurality of supporting rollers or guide members can also be employed to guide the PTFE and felt, and even regulate the tension of these materials as they are delivered to the rollers 25 and 26.

Heating means are also provided to increase the temperature of the first and second layers of material, respectively 10' and 11, as they pass through the nip between the pressure rollers 25 and 26. In FIG. 1 the heating means is shown preferably comprising the upper roller 25 which contains a heating element (not shown), such that the acrylic felt 10' and PTFE film 11 passing between the rollers 25, 26 are heated. The heat activates the FEP polymer present in the acrylic felt so that the PTFE film layer bonds to the FEP polymer carried by the acrylic felt 10', and therefore becomes one unit with the acrylic felt 10' serving as the substrate layer. The heated upper roller 25 is maintained at an operating temperature above that needed to melt the FEP adhesive. Preferably the heated roller 25 is maintained at a temperature of above 500° F. and more particularly, it is preferred to maintain the heated roller 25 at a temperature of about 60° F.

The FEP which melts at about 500° F. must be heated to a sufficient temperature so that melting will take place. The melting of the FEP enables the bonding of the PTFE film 11 to the acrylic layer 10' to form a laminate 12. The pressure roller 26 provides increased force upon the acrylic and PTFE layers, respectively 10' and 11, which in turn also increases the pressure under which the FEP adhesive component is placed. The acrylic layer 10' and the PTFE film 11 become compressed against one another so that a surface of the PTTE 11 is in contact with the FEP adhesive particles which melt in the presence of the heat from the upper roller 25 and the pressure exerted by the lower pressure roller 26.

The PTFE and acrylic felt materials are moved through the rollers 25 and 26 at a sufficient speed to prevent the acrylic layer 10' from deteriorating and becoming charred by the heat. The resultant product passing through the rollers 25 and 26 is a laminate 12 comprising the acrylic felt 10' as a substrate bonded by the FEP 40 to the microporous PTFE layer 11, as shown in FIG. 2.

The other of the rollers, such as that 26 shown in FIG. 1 as the lower roller in relation to the upper roller 25, is provided as a pressure roller to compress the treated acrylic felt material 10 and the PTFE film 11 being introduced thereto from a bolt or dispensing roller 27 shown above the pressure rollers 25, 26. The porous PTFE is fed from the PTFE dispensing roller 27, over a guide roller 28 and into the nip between the pressure rollers 25, 26, where a surface of the PTFE film 11 joins a surface of the acrylic felt 10. The heat from the upper roller 25 promotes adhesion as the felt and PTFE layers meet.

The resultant material then emerges from the pressure rollers 25, 26 as a laminate composite 12 and is allowed to cool. The cooling can take place at room temperature or can be enhanced by suitable cooling means (not shown).

Referring to the upper heated roller and lower pressure roller, respectively 25 and 26, a slide shaft 31 is shown mounted on the axis 33 of the lower roller 26, and comprising a slotted track 32 for movement along the roller shaft or axis 34 of the upper roller 25. This arrangement permits the lower pressure roller 26 to be moved in a vertical direction indicated by arrow 35 to regulate the amount of compression needed to bond the porous PTFE film layer 11 with the acrylic felt material 10. Compression regulating means are also provided, generally represented by the numeral 36, which may for example comprise a pneumatic or hydraulic piston or cylinder arrangement, or other like suitable device which can raise and lower a supporting shaft 37 which is shown extending from a connecting member 38 of the regulating means 36 to the axis or shaft 33 of the lower roller 26. Likewise, while not shown, the arrangement of the slide shaft 31 and supporting shaft 37 can be provided on each lateral axial end of the rollers 25 and 26, although only one side of the rollers 25 and 26 is shown in FIG. 1.

The immersion process of the present invention permits a flexible laminate product to be obtained which can be used as a filtration media in a variety of applications. The resultant laminate 12 comprising an acrylic substrate 10 and a porous PTFE layer 11 bonded thereto, may be cut or formed into desired configurations for particular filtration applications. For example, in baghouse filtration operations which call for a low temperature material which has high resistance to abrasion, the present product can be used to filter particulate matter from a fluid or gaseous stream. These and other advantages of the present invention will be understood by one of ordinary skill in the art by a reading of the above objects of the present invention, the detailed description of the invention and the appended claims, and by reference to the following examples.

EXAMPLE 1

An untreated acrylic homopolymer polyacrylonitrile felt having a density of approximately 15 oz./yd$^2$ was employed to construct a laminate with a microporous PTFE layer having a thickness of about 0.4 mils and a pore size of about 3 microns. Heat bonding was used to fuse the PTFE layer to the acrylic felt. The resultant product was a stiff, embrittled acrylic material which would not be suitable for use as a fabric.

EXAMPLE 2

An untreated acrylic homopolymer polyacrylonitrile felt having a density of approximately 15 oz./yd$^2$ was employed to construct a laminate with a microporous PTFE layer having a thickness of about 0.4 mils and a pore size of about 3 microns. The felt had a soft feel at the start of the process. The felt was treated by delivering the felt to a tank and immersing the felt in an aqueous solution containing FEP and a wetting agent and water, supplied in the form of Teflon FEP 120 from DuPont. The felt was then permitted to become impregnated with the adhesive solution, whereupon the acrylic felt was then dried in a gas heated long oven. The felt was still soft upon drying. The weight of the felt after drying was approximately 16.5 oz/yd$^2$ signifying that the acrylic felt had picked up 10 percent by weight gain of the FEP. The felt remained soft and had an average Frazier Permeability of 35.7 cfm/ft$^2$ and a Mullen burst strength of 597 psi. Next the treated acrylic felt was presented to a pair of pressure rollers along with the PTFE film. The felt and PTFE material were compressed by the rollers wherein one roller was heated and maintained at a temperature of 625 F. The PTFE layer and the felt layer were compressed by the rollers and moved through the rollers at a sufficient speed so that the FEP contained in the acrylic felt melted but the acrylic felt itself remained soft and did not become embrittled or begin to decompose.

After the PTFE and acrylic layers were bonded by the melted FEP during the roller compression a laminate was formed. The resultant laminate was soft to the tough and had a weight of 16.5 oz/yd$^2$. The laminate produced had an average Frazier permeability of 8 cfm/ft$^2$ and had a Mullen burst strength of 665 psi. The bond integrity of the laminate was also measured by forcing a pressure of air (an air blast) through a 0.375" diameter nozzle. The laminate was found to withstand at least a 15 sec. burst of air pressure at 85 psi, after which the bonding remained in tact. A useful product produced by the process of the present invention was obtained.

What is claimed is:

1. A process for preparation of a laminate; said process including the steps of:
   (a) providing a first layer of acrylic fiber felt having a propensity toward embrittlement and degradation at temperatures above a temperature between about 284° F. and 350° F.;
   (b) immersing the first layer of acrylic felt into an aqueous bath comprising:
      (i) a fluoropolymer resin having a melting temperature of at least about 500° F.; and,
      (ii) water; said step of immersing being conducted for a period sufficient to absorb polymer resin into the acrylic fiber felt;
   (c) drying the fluoropolymer resin impregnated acrylic felt resulting from step 20(b);
   (d) laminating a microporous polytetrafluoroethylene substrate to the fluoropolymer resin impregnated acrylic felt at a temperature of at least the melting temperature of the fluoropolymer resin.

2. A process according to claim 1 wherein:
   (a) said step of laminating comprises simultaneously passing a web of fluoropolymer resin impregnated acrylic felt and a web of polytetrafluoroethylene between a pair of rollers;
      (i) only one roller of the pair of rollers being heated to at least 500° F.

3. A process according to claim 2 wherein:
   (a) said step of laminating comprises simultaneously passing a web of fluoropolymer resin impregnated acrylic felt and a web of polytetrafluoroethylene between a pair of rollers;
      (i) only one roller of the pair of rollers being heated to at least 600° F.

4. A process according to claim 2 wherein:
   (a) said step of immersing comprises immersing in an aqueous bath including fluorinated ethylene propylene copolymer.

5. A process according to claim 1 wherein:
   (a) said step of immersing comprises immersing in an aqueous bath including fluorinated ethylene polymer.

6. A process according to claim 23 wherein:
   (a) said step of providing acrylic fiber felt comprises providing an acrylic fiber felt having a thickness of at least 0.02 inches.

7. A process according to claim 6 wherein:
   (a) said step of laminating a polytetrafluoroethylene substrate comprises laminating a polytetrafluoroethylene substrate having an average thickness within the range of 0.2 mil to 15 mil.

8. A process according to claim 7 wherein:
   (a) said step of laminating a polytetrafluoroethylene substrate comprises laminating a polytetrafluoroethylene substrate having an average thickness within the range of 0.2 mil to 0.6 mil.

9. A process according to claim 7 wherein:
   (a) said step of laminating a polytetrafluoroethylene substrate comprises laminating a porous polytetrafluoroethylene substrate having an average pore size of about 0.02 to 10 microns.

10. A process according to claim 9 wherein:
    (a) said acrylic fiber felt and said polytetrafluoroethylene substrate are selected such that the resulting laminate has a Frazier permeability of at least 8 cfm/ft$^2$.

11. A process according to claim 9 wherein:
    (a) said acrylic fiber felt and said polytetrafluoroethylene substrate are selected such that the resulting laminate has a Mullen burst strength of at least 665 psi.

12. A process according to claim 9 wherein:
    (a) said acrylic fiber felt and said polytetrafluoroethylene substrate are selected such that the resulting laminate has sufficient integrity to withstand at least a 15 second burst of air pressure at 85 psi.

13. A process according to claim 9 wherein:
    (a) said step of providing acrylic fiber felt comprises providing an acrylic fiber felt having a density of about 15 oz./yd$^2$.

14. A process according to claim 13 wherein:
(a) said steps of immersing and drying are conducted sufficiently to provide an increase in weight of the acrylic fiber polymer, due to fluoropolymer resin impregnation, of at least about 10%.

15. A process according to claim 9 wherein:
(a) said steps of immersing and drying are conducted sufficiently to provide an increase in weight of the acrylic fiber polymer, due to fluoropolymer resin impregnation, of at least about 10%.

16. A process according to claim 9 wherein:
(a) said steps of immersing and drying are conducted sufficiently to provide an increase in basis weight of the acrylic fiber polymer, due to fluoropolymer resin impregnation, of at least about 1.5 oz/yd$^2$.

17. A process according to claim 9 wherein:
(a) said step of providing a first layer of acrylic fiber felt comprises providing a first layer of acrylic fiber felt including long chain polymer comprising at least 85% acrylonitrile, and a comononer.

18. A process according to claim 17 wherein:
(a) said step of providing a first layer of acrylic fiber felt comprises providing a felt comprising a copolymer of acrylonitrile and vinylidene chloride.

19. A process according to claim 9 wherein:
(a) said step of providing a first layer of acrylic fiber felt includes providing a first layer of acrylic felt which comprises a homopolymer of acrylonitrile.

* * * * *

UNITED STATES PATENT AND TRADEMARK OFFICE
CERTIFICATE OF CORRECTION

PATENT NO.   : 5,922,166  
DATED        : July 13, 1999  
INVENTOR(S)  : Dillon

Page 1 of 1

It is certified that error appears in the above-identified patent and that said Letters Patent is hereby corrected as shown below:

Column 6,  
Line 4: "60°" should read -- 600° --.

Column 7, claim 1,  
Line 57: ";" should read -- , --.

Signed and Sealed this

Eleventh Day of September, 2001

Attest:

NICHOLAS P. GODICI  
Attesting Officer   Acting Director of the United States Patent and Trademark Office